June 1, 1965  G. W. SMITH  3,186,118
MOLDED ARTICLE
Filed Jan. 25, 1962  3 Sheets-Sheet 1
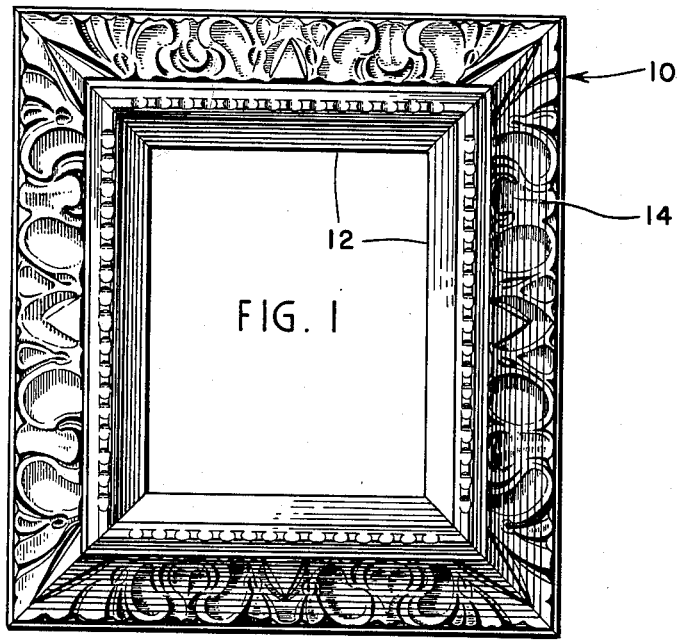
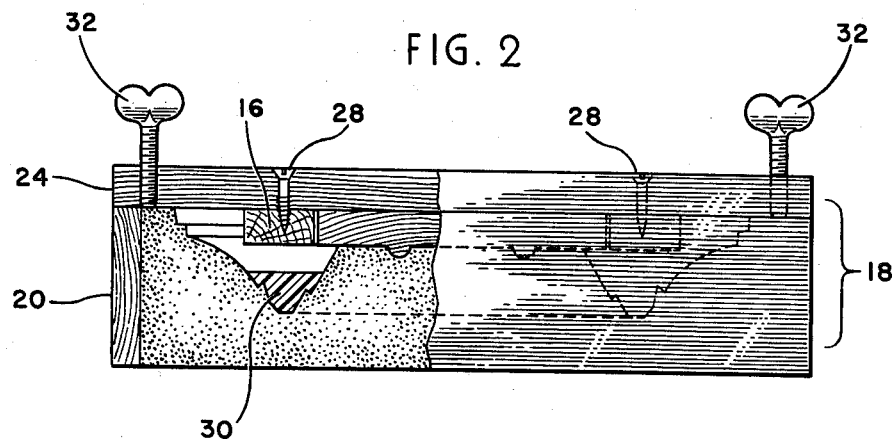
INVENTOR.
George Warren Smith
BY his Attorney June 1, 1965　　　G. W. SMITH　　　3,186,118
MOLDED ARTICLE Filed Jan. 25, 1962　　　　　　　　3 Sheets-Sheet 3

SECTION 6-6

INVENTOR.
George Warren Smith
BY his Attorney

United States Patent Office 3,186,118
Patented June 1, 1965

3,186,118
MOLDED ARTICLE
George Warren Smith, 4 Inverness Road,
Winchester, Mass.
Filed Jan. 25, 1962, Ser. No. 168,617
2 Claims. (Cl. 40—154)

This invention relates to molded articles and in particular to an improved deep molded picture frame.

The frame in which a painting is mounted is an introduction to the painting and in some measure determines the attitude of the observer. Deep solid appearing frames with detailed three dimensional sculpturing and appropriate color and texture of finish create an impression of depth and value. Heretofore the best of such frames have been carved of wood and have been costly.

Less expensive imitations of the carved wood frames have been molded of plaster, of solid resin and filler compositions or have been formed from sheet material. The plaster, however, is brittle; and the filled resin composition for manufacturing and cost reasons is usually made relatively thin in cross section and lacking in the deep sculptured effect. Both are heavy and present hanging and shipping problems. Vacuum formed plastic frames lack rigidity and tend to warp or twist.

It is an object of the present invention to provide a deeply sculptured 3 dimensional frame or similar molded decorative article which is resistant to marring, light in weight, and capable of manufacture at moderate cost.

It is a further object to provide deep sculptured articles having relatively thick cross section and surfaces receptive to a variety of finishes and reproducing fine detail for any desired effect.

To these ends and in accordance with a feature of the present invention, I have provided a molded decorative article including a body portion of rigid cellular resin with light weight embedments and having an integral impervious surface insoluble in, but receptive to, surface finishing compositions, and a substantially opaque surface finish firmly adhered to that surface.

Another feature of the invention is to provide a light strong article having many of the characteristics of carved wood; but having improved dimensional stability, surface smoothness, resistance to cracking and greater lightness.

Deeply sculptured articles according to the present invention are produced by expanding a polymer resin composition within a closed mold under controlled conditions and with a special placement of light strong embedments effective to enable extraction of molded articles and to give superior character and strength to the finished articles.

The invention will be described with particular reference to a deeply sculptured frame member or frame for a picture or a mirror and an eagle ornament, but it is to be understood that the frame members may be used for other ornamental articles such as plaques.

In the drawings forming part of the disclosure of the present application:

FIG. 1 is a plan view of a novel deeply sculptured picture frame;

FIG. 2 is an elevational view with parts broken away of a mold for forming the frame of FIG. 1 and showing resin in position to be expanded and the special embedments secured to the closure part of the mold in position for cooperation with the resin;

Figure 3:
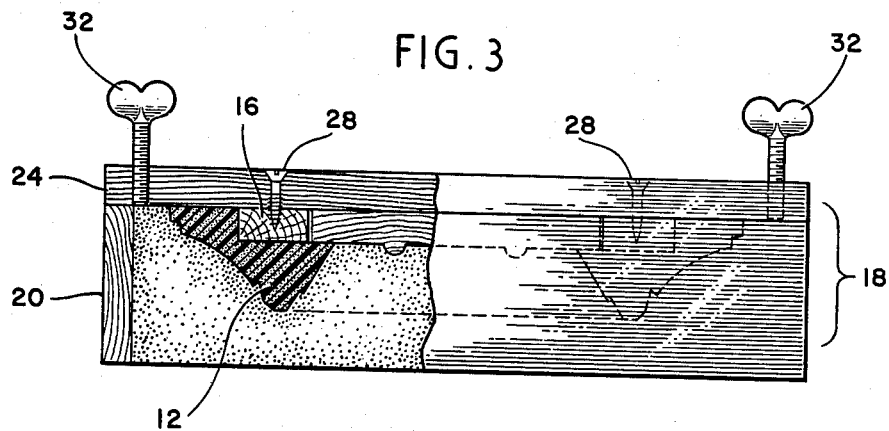
FIG. 3 is an elevational view with parts broken away of the mold of FIG. 2 after expansion and hardening of the resin to fill the mold.

The frame shown in FIG. 1 has a main body portion 10 of continuous cellular resinous material arranged as four sides 12 defining an opening for display of a picture or mirror. The sides 12 of the frame include substantial areas with relatively long convex and concave curved surfaces 14 at steep angles to the plane of the back of the frame creating an impression of solidity and worth. For obtaining the desired character at least certain cross sections have a thickness at their thickest portions of at least three quarters of an inch and preferably an inch or more. Also in a frame, the length of parts, i.e. the sides 12 of the body portion is at least three times the maximum thickness of the cross section of such portions.

An embedment member or embedment members 16, suitably of wood hard board, thin metal or comparable light strong material extend in from the unexposed back surface of the frame and are strongly held by the cellular resinous body portion 10. In the frame shown, these members 16, which are spaced from the exposed surfaces of the frame extend substantially the entire length of the sides. The ends of the members 16 may be fastened together at the corners or may simply abut.

Frames with curved sides for example oval or circular frames may also be made using an embedment member or members. In such frames the length is taken as the overall distance from top to bottom or from side to side.

The integral association of the resinous body portion 10 and the embedment members 16 is effected in the course of forming the frame using the mold 18 shown in FIG. 2. That mold comprises a concave part 20 with molding surface 22 complementary to the desired shape of the article i.e. the frame to be formed, and a cover 24 for engaging the top surface 26 of the walls of the concave part 20 to form a closed mold cavity. The concave part 20 and cover part 24 are ordinarily coated with mold release before use. The embedment members 16 will not be coated with mold release in order to allow firm bonding. The cover part 24 may be plane or may have additional contoured molding surfaces. As shown more particularly in FIGS. 2, 3 and 4, the embedment members 16 are removably secured as by means of screws 28, to the cover part 24. A mass 30 of expandable resinous material, preferably a liquid material, such as a known mixture reactive to form a rigid or semi-rigid polyurethane foam, is disposed in the concave mold part 20.

A useful reaction mixture is as follows: Approximately 50 parts of a prepolymer formed by the reaction of toluene diisocyanate with a polyether glycol with an excess of toluene diisocyanate to give a free isocyanate content of approximately 28% is combined with 50 parts of a resin masterbatch consisting of a polyether glycol, a surfactant, a catalyst and a fluorocarbon blowing agent. Equally good results can be obtained with polyester glycols alone or admixed with polyether glycols. Also the blowing can be accomplished by including a small amount of water in place of the fluorocarbon blowing agent.

The cover part 24 is secured in placed by suitable closure means (not shown), with the embedment members 16 projecting into the mold cavity thus defined. The quantity of the resinous material introduced is capable on free expansion of filling a volume at least about 10% in excess of the free volume of the mold cavity. Expansion of this amount of resin generates pressure forcing the resin into close engagement with all surfaces in the mold to reproduce accurately the contours of the mold and to form a skin of cured resin at the surfaces somewhat denser and stronger than the resin in the interior. The embedment members 16 reduce the cross sectional area of the free space adjacent the cover part 24 so that, although this portion of the space is last filled by the expanding resin, the resin is pushed into this reduced area and bonds firmly to the embedment members, and is at least as dense as the resin in other portions of the mold.

After expansion and hardening of the resin in the mold, separating force is applied to the closure part to separate it from the concave part of the mold. The embedment members 16 are attached to the cover part 24 and transmit the separating force uniformly over the length of the molded resin to extract it from the concave mold part 20 without the development of localized stress and fracture commonly met in removing articles having a high ratio of length to cross section. This action is particularly important with the present deeply sculptured article because of the great resistance to separation created by the long and steeply sloped surfaces of the article.

Figure 4:
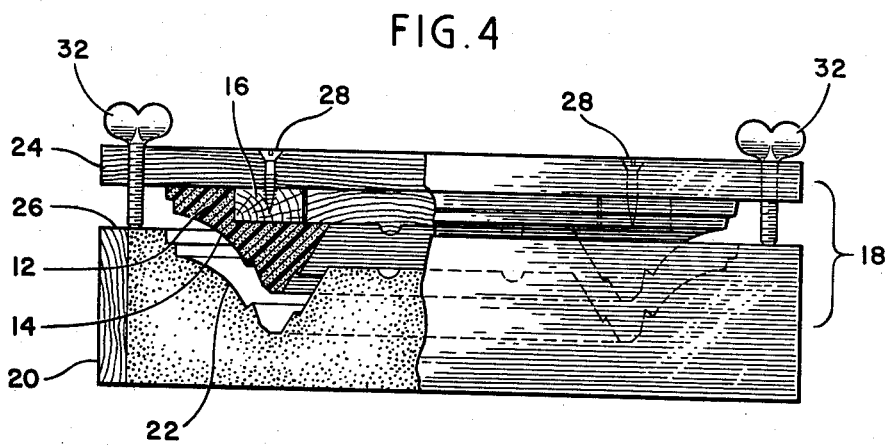
FIG. 4 is an elevational view illustrating the removal of the molded resin from the mold.

As shown in FIGS. 2, 3 and 4 jacking devices such as thumbscrews 32 may be mounted at spaced points on the cover part with the ends of the thumbscrews disposed to bear against the top surfaces 26 of the walls of the concave part. By turning the thumbscrews, uniform force may be exerted over the cover part 24 to force it and the embedment members 16 and hardened resin away from the concave part.

The frame after removal from the mold presents a smooth impervious surface somewhat denser and stronger than the interior portions of the resin and reproducing faithfully the character and even the fine texture of the molding surfaces. This desired density and surface nature extend to the very back of the exposed surfaces of the article.

The screws 28 holding the closure part of the mold to the embedment members are removed; and the molded frame is then given coatings of desired finishes on its exposed surfaces. Where the article is molded of polyurethane foam, any desired finishing agent may be applied since the resin is not attacked by solvents commonly used in such finishes.

In the finished frame, the embedment members 16 provide useful reinforcement of the sides, and, in combination with the relatively thick integral resinous body, form corners of adequate strength and excellent rigidity without the need for corner bracing. As an added advantage, the members 16 are a convenient base for holding fastening hooks or other supporting means for the frame.

Figure 5:
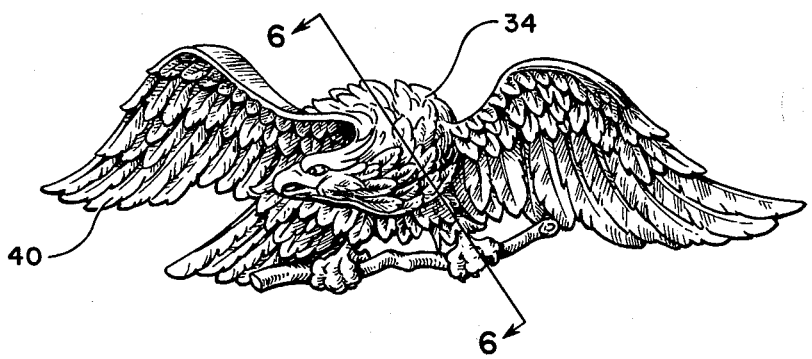
FIG. 5 is a plan view of a deeply sculptured molded eagle ornament.
Figure 6:
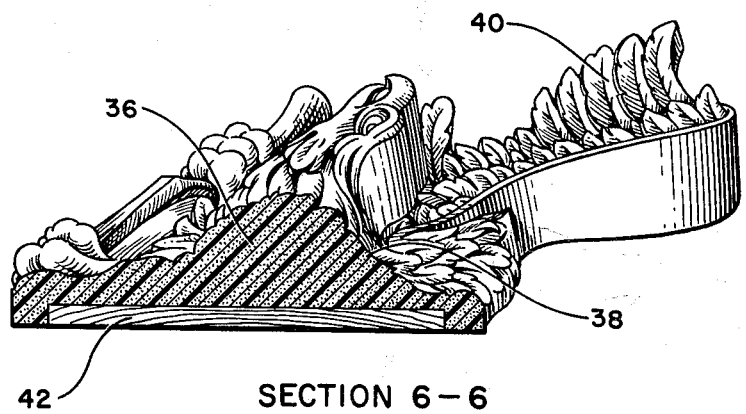
FIG. 6 is an angular sectional view on an enlarged scale taken on the line 6—6 of FIG. 5 showing the disposition of the embedment relative to the resinous portion of the ornament.

The eagle ornament 34 shown in FIGS. 5 and 6, illustrates application of the principles of the present invention in another relation. The central portion 36, including the head, body and wing shoulder is thick and massive. The actual sloping surfaces 38 are large and the angle in various portions very steep. The wing parts 40 from the wing base out to the wing tips are quite long and the ratio of length of the wing parts 40 to the thickness is at least three to one. In this embodiment as in the frame, an embedment member 42 is strongly held within the molded resin portion. Much the same advantages as in the frame are obtained in manufacture of the eagle ornament; and the resulting ornament possesses the desirable surface character, ease of finishing, strength and convenient attaching base.

Having thus described my invention what I claim as new and desire to secure by Letters Patent of the United States is:

1. A light weight integral frame member comprising a body portion with a back surface portion for mounting against a wall and a substantially impervious sculptured exposed surface portion presenting a design in three dimensions including substantial surface areas at a steep angle to the plane of the back surface, said body portion comprising a continuous interior mass of substantially rigid cellular resin and an integral non-cellular cured resin surface, parts of said body portion having a ratio of length to thickness greater than three to one and a stiff, strong embedment member integrally united to said interior mass of cellular resin and constituting a base for holding supporting means for said article, said embedment member being disposed adjacent the back surface portion and extending substantially the length of said article to reinforce said article, said exposed surface portions being denser and stronger than the interior of said mass of resin and being insoluble in surface finishing compositions applied thereto.

2. A decorative frame comprising a body portion defining an opening for display of a picture or mirror, said body portion having a back surface for mounting against a wall and a substantially impervious sculptured exposed surface portion presenting a design in three dimensions including substantial surface areas at a steep angle to the plane of the back surface, said body portion comprising a continuous mass of substantially rigid cellular resin and an integral non-cellular curved resin surface, parts of said body portion having a ratio of length to thickness greater than three to one and stiff, strong embedment members integrally united to said interior mass of cellular resin and constituting a base for holding supporting means for said frame, said embedment members being disposed adjacent back surface portions and extending substantially the length of said frame to reinforce said frame, said exposed surface portions being denser and stronger than the interior of said mass of resin and being insoluble in surface finishing compositions applied thereto.

References Cited by the Examiner
UNITED STATES PATENTS

| | | | |
|---|---|---|---|
| 159,555 | 2/75 | Wilson | 40—154 |
| 314,833 | 3/85 | Harsha | 40—154 |
| 2,458,349 | 1/49 | Cross | 40—154 |
| 2,541,297 | 2/51 | Sampson | 18—59 |
| 2,762,739 | 9/56 | Weiss | 50—268 X |
| 2,806,310 | 9/57 | Boyd | 40—154 |
| 2,981,984 | 5/61 | Orr | 18—59 |
| 2,988,835 | 6/61 | Murphy | 40—136 X |
| 3,029,172 | 4/62 | Glass | 50—268 X |
| 3,050,414 | 8/62 | Reilly | 154 |

JEROME SCHNALL, *Primary Examiner.*

EDWARD V. BENHAM, *Examiner.*